United States Patent
Stephan

(10) Patent No.: US 8,807,621 B2
(45) Date of Patent: Aug. 19, 2014

(54) INSERT FOR A DASHBOARD

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/648,758

(22) Filed: Oct. 10, 2012

(65) Prior Publication Data
US 2013/0093205 A1    Apr. 18, 2013

(30) Foreign Application Priority Data
Oct. 14, 2011   (DE) .......................... 10 2011 084 500

(51) Int. Cl.
*B60R 11/00*   (2006.01)
*B60R 11/02*   (2006.01)
*B60R 7/06*    (2006.01)

(52) U.S. Cl.
CPC ......... *B60R 11/02* (2013.01); *B60R 2011/0075* (2013.01); *B60R 2011/0094* (2013.01); *B60R 11/0241* (2013.01); *B60R 7/06* (2013.01); *B60R 2011/0005* (2013.01)
USPC ...................................................... 296/37.12

(58) Field of Classification Search
USPC ................... 296/37.12, 37.8, 24.34, 70, 1.07
See application file for complete search history.

(56) References Cited

U.S. PATENT DOCUMENTS

| | | | |
|---|---|---|---|
| 7,469,951 B2 | 12/2008 | Welschholz et al. |
| 7,623,958 B1 | 11/2009 | Laverick et al. |
| 2008/0174136 A1 | 7/2008 | Welschholz et al. |
| 2009/0152418 A1 | 6/2009 | Bury |

FOREIGN PATENT DOCUMENTS

| | | |
|---|---|---|
| DE | 19817345 A1 | 10/1999 |
| DE | 102006008420 A1 | 8/2007 |
| FR | 2932442 A1 | 12/2009 |
| WO | 2008065298 A1 | 6/2008 |
| WO | 2009043367 A1 | 4/2009 |
| WO | 2009127439 A2 | 10/2009 |

OTHER PUBLICATIONS

European Patent Office, Search Report for the corresponding European Patent Application No. 12186130.6 dated Dec. 5, 2012.

*Primary Examiner* — Joseph Pape
*Assistant Examiner* — Dana Ivey
(74) *Attorney, Agent, or Firm* — Vichit Chea; Brooks Kushman P.C.

(57) ABSTRACT

A unit for storing items in a motor vehicle interior includes a main storage compartment and a docking station for a portable electronic device such as a smart phone or a navigation device. A main cover is movably attached to the storage compartment to enclose the main storage compartment, and a docking cover encloses a sub-portion of the storage compartment. The docking cover is movable to an in-service position wherein its underside is exposed. A device holder is attached to the underside of the docking cover for holding a mobile electronic device in an access position when in the docking cover is in the in-service position. The docking cover and the portion are inset relative to a perimeter of the storage compartment, so that the docking station forms a portion of a main perimeter of the storage compartment.

12 Claims, 3 Drawing Sheets

INSERT FOR A DASHBOARD

CROSS-REFERENCE TO RELATED APPLICATIONS

This application claims foreign priority benefits under 35 U.S.C. §119(a)-(d) to DE 10 2011 084 500.3, filed Oct. 14, 2011, which is hereby incorporated by reference in its entirety.

TECHNICAL FIELD

The invention relates to storage compartments for enclosed storage of small items in or on a dashboard of a motor vehicle, and specifically to such a storage compartment including a docking apparatus for holding a mobile electronic device in an access position wherein it may be easily viewed and/or operated by vehicle occupants.

BACKGROUND

In modern motor vehicles, portable consumer electronic devices (such as "smart" phones, digital music storage/player devices, hand-held navigation systems, etc.) are increasingly frequently used to augment or replace the vehicle's "built-in" entertainment and/or navigation system(s).

It may be desirable to include in the vehicle interior, and particularly in the area of the dashboard or instrument panel, a mechanical support to hold such portable electronic devices in a "hand-free" manner. An electronic interface and/or a power supply connection for the device may also be desirable. The supports must hold the mobile devices securely, but should be as unobtrusive as possible when not in service. At the same time, the supports should ideally hold the device in a position in which it is easily viewed by vehicle occupants.

SUMMARY

In a disclosed embodiment, apparatus for storing items in a motor vehicle interior comprises a storage compartment installable in a dashboard of the motor vehicle, a main cover movably attached to the storage compartment to cover a first portion thereof, a docking cover attached to the storage compartment for movement between a closed position covering a second portion of the storage compartment and an in-service position wherein an underside of the docking cover is exposed. A device holder is attached to the underside of the docking cover for holding a mobile electronic device in an access position when the docking cover is in the in-service position. The docking cover and the portion are inset relative to a perimeter of the storage compartment, so that the docking station forms a portion of a main perimeter of the storage compartment.

In another disclosed embodiment, apparatus for storing items in a motor vehicle interior comprises a storage compartment adapted for installation in a dashboard of a motor vehicle, and a docking station within the storage compartment for an electronic device. The docking station comprises a sub-area separated from a main portion of the storage compartment by a dividing wall, a docking cover attached to the storage compartment and moveable between a closed position enclosing the sub-area and an in-service position wherein an underside of the docking cover is exposed, and a device holder attached to the underside for holding a mobile electronic device in an access position when the docking cover is in the in-service position A main cover is attached to the storage compartment for movement between a closed position enclosing the main portion of the storage compartment and an open position permitting access to the main portion.

BRIEF DESCRIPTION OF THE DRAWINGS

Embodiments of the present invention will now be described by way of example only with reference to the accompanying drawings in which.

DETAILED DESCRIPTION

Figure 1:
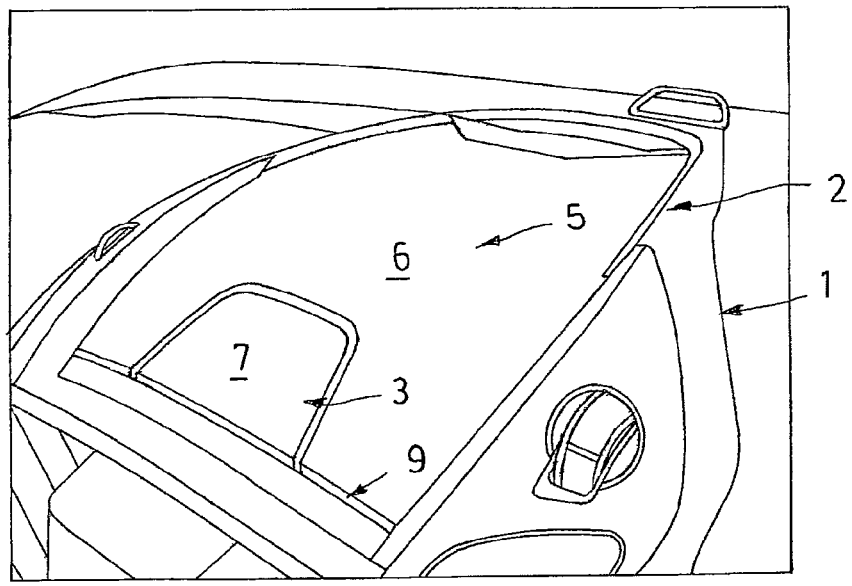
FIG. 1 is a schematic perspective view of a motor vehicle interior looking forward and to the left of the vehicle overall and showing a dashboard and storage unit.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A motor vehicle dashboard is generally designated by reference numeral 1. A storage unit 2 is installed in dashboard 1 and comprises a storage compartment 5 that includes a docking station 3 for holding a mobile electronic device 4 (see FIG. 3). FIGS. 1-4 are Storage compartment 5 may advantageously take the form of a tray recessed below an upper surface of the dashboard 1 and is subdivided into a main portion 5a and a smaller, second portion 5b that is inset into the main portion so that the main and second portions together form a common perimeter of storage compartment 5. Second portion 5b may thus be seen to be a sub-portion included within the perimeter of storage compartment 5.

Main cover 6 is movable relative to the storage unit 2 between a closed position (shown in FIGS. 1-3) enclosing main portion 5a of the storage compartment and an open position (shown in FIG. 4) allowing access to the main portion by occupants of the vehicle.

Figure 2:
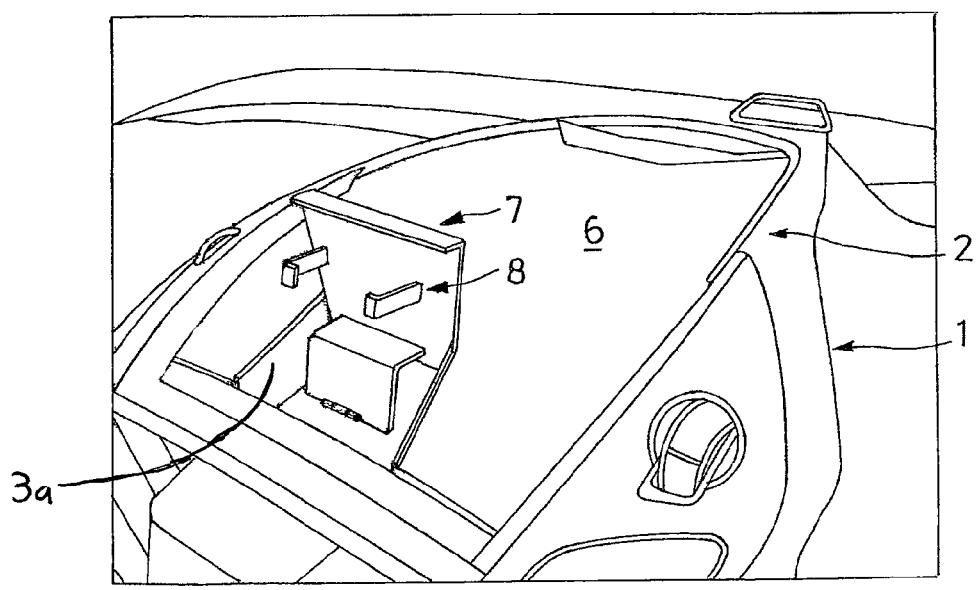
FIG. 2 is a schematic perspective view of the storage unit from FIG. 1 with a docking station cover folded open.
Figure 3:
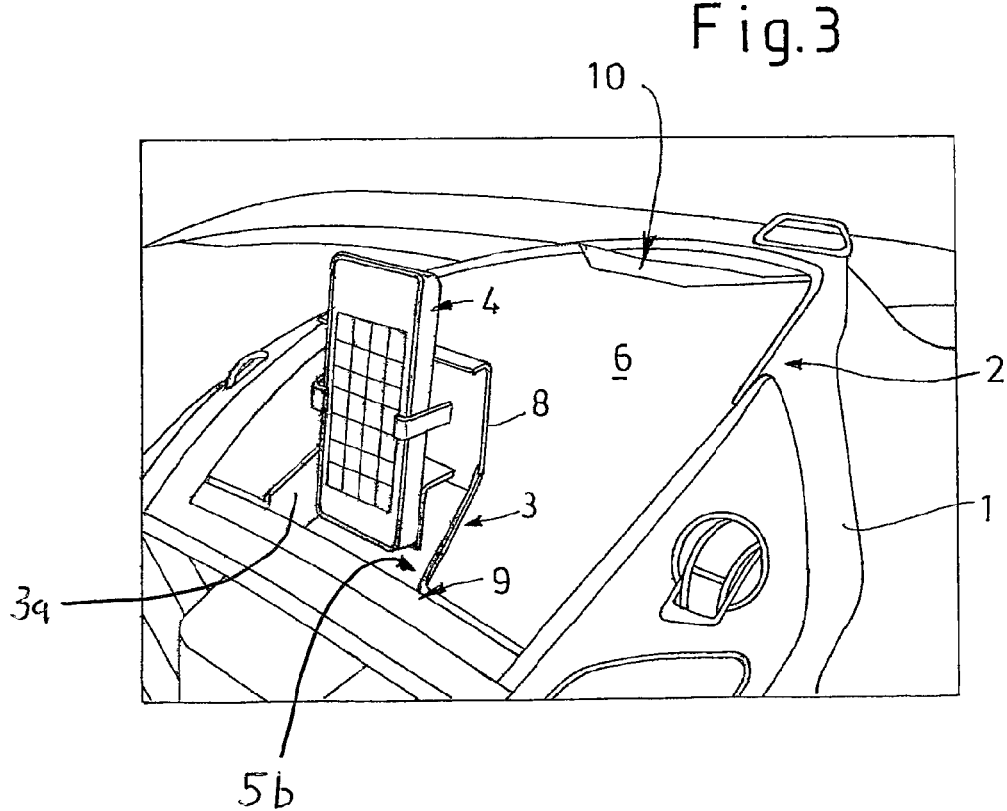
FIG. 3 is a schematic perspective view of the storage unit from FIG. 1 with a mobile device inserted in the docking station.

Docking cover 7 is movable (separately from main cover 6) between a closed position (FIG. 1) and an in-service position (FIGS. 2 and 3). In the closed position docking cover 7 encloses second portion 5b of the storage compartment. In the in-service position an underside 8 of the docking cover 7 faces generally rearward (relative to the vehicle overall) and toward seating areas of the vehicle. In the closed position docking cover 7 may be generally flush with the surface of main cover 6 when it, too, is in its closed position. A notch or cut-out in the rearmost (relative to the vehicle overall) edge of the main cover 6 fits around docking cover 7 when the main cover is closed. Docking cover 7 together with second storage portion 5b comprise docking station 3.

A dividing wall 3a may extend around some or the entire perimeter of second storage portion 5b to define the second portion and separate it from main storage portion 5a. In the exemplary embodiment illustrated herein, storage compartment main portion 5a surrounds the area of the docking station 3 on three sides (forward, left, and right), with wall 3a extending along those three sides. On the fourth or remaining side, main storage compartment 5 and the area of the docking station 3 form a common outer edge 9 of the storage unit 2.

Figure 4:
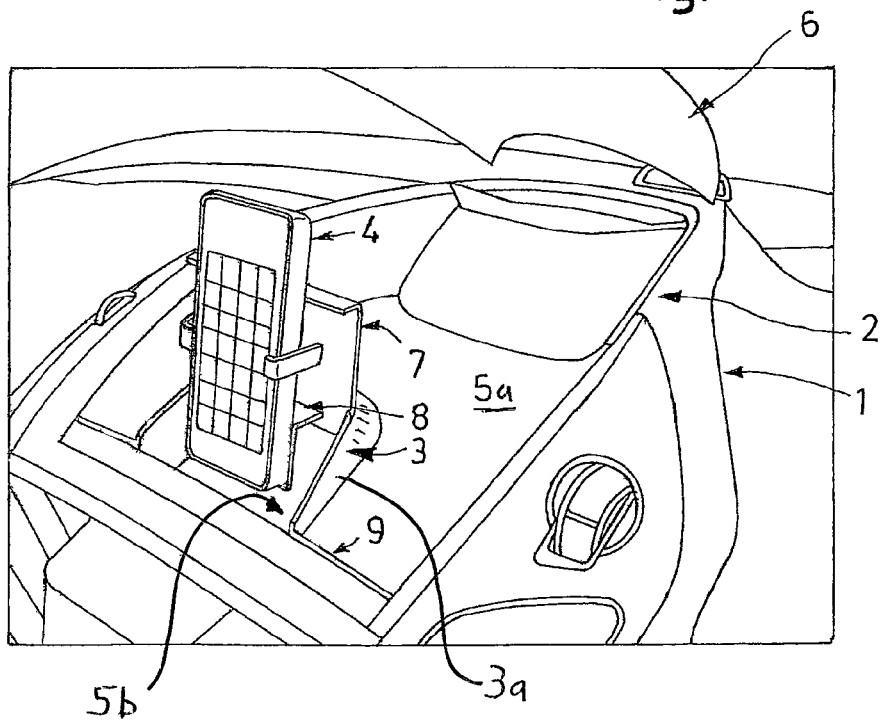
FIG. 4 is a schematic perspective view of the storage unit from FIG. 1 with a main cover and a docking station cover in their respective open positions.
Figure 5:
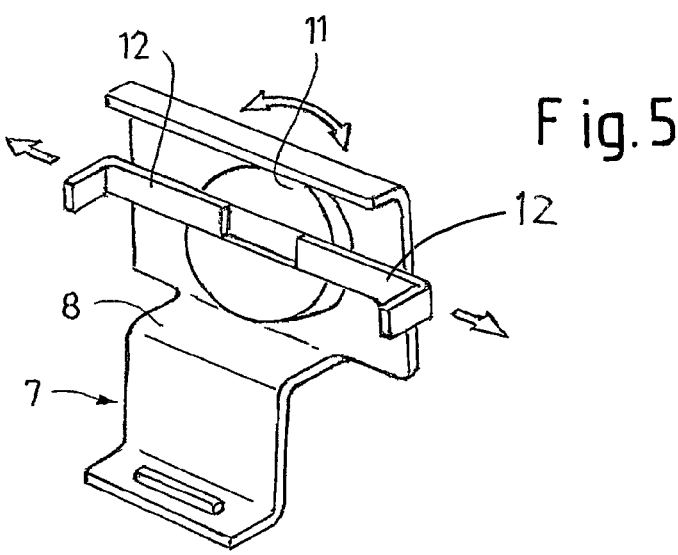
FIG. 5 is a schematic perspective view of a device holder from FIG. 2.

As best seen in FIG. 5, docking station 3 further comprises a device holder 11 for securely retaining mobile electronic device 4 in an access position wherein it may be conveniently viewed and/or operated by vehicle occupants. Device holder 11 may comprise retaining fingers 12 that are adjustable towards/away from one another (such movement indicated by the two outwardly-directed arrows in FIG. 5) to adjust the grip width around mobile electronic device 4, such that devices of different sizes may be held. Mobile electronic device 4 may thus be arranged either in an upright (as seen in FIGS. 3 and 4) or transverse (not shown) orientation, depending on which orientation is desired.

Device holder 11 may, in one exemplary embodiment, be rotatable about an axis oriented approximately normal to the plane of the docking cover 7 (such rotation being indicated by the double-headed arrow in FIG. 5) to further enable accommodation of mobile device 4 in either an upright or transverse orientation. Mobile device 4 may thus, if necessary, be moved between the upright and transverse position without being removed from the retaining fingers 12. A hard-wired electronic communication interface or electrical connection between the mobile device and the vehicle may be provided by cable or a direct plug-in connection. These may either be of immobile or likewise co-rotating construction.

Despite the storage unit 2 being jointly assembled and of one-piece construction, the docking station 3 and the main storage compartment 5 may be used independently of one another as the respective covers 7 and 6 may be separately operated and closed.

Because the storage unit 2 comprises a docking station along with a recessed storage space with a separate cover, the storage space at least partially surrounding the area of the docking station, it is possible to provide flexible storage capacity without a plurality of separate storage units being necessary. This simplifies the structure and manufacture of the dashboard and also of the storage unit, and the fastening and installation thereof in the dashboard. Assembly is additionally facilitated, since it is only additionally necessary to insert and connect a single storage unit with two functions. Since separate covers are provided, the docking apparatus and the main storage space may nevertheless alternatively be used.

An additional coin tray 10 (see FIG. 3) may be arranged in the forward area (relative to the vehicle overall) of the storage unit 2. The main cover 6 may, if desired, be configured to leave the coin tray uncovered even when in the closed position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
    a storage compartment installable in a dashboard of a motor vehicle and being subdivided into a main portion and a second portion separate from the main portion;
    a main cover movable relative to the storage compartment between a) a closed position enclosing the main portion of the storage compartment and not enclosing the second portion of the storage compartment, and b) an open position allowing access to the main portion of the storage compartment;
    a docking cover movable separately from the main cover relative to the storage compartment between a) a closed position enclosing the second portion of the storage compartment and wherein an underside of the docking cover is oriented toward an interior of the second portion of the storage compartment, and b) an in-service position allowing access to the second portion of the storage compartment and wherein the underside of the docking cover is exposed; and
    a device holder attached to the underside of the docking cover for holding a mobile electronic device in an access position when the docking cover is in the in-service position.

2. The apparatus of claim 1, wherein an outer edge of the storage compartment defines a perimeter around the main portion and the second portion of the storage compartment, and a portion of an edge of the docking cover coincides with the perimeter of the storage compartment.

3. The apparatus of claim 1, wherein the device holder is mounted to the docking cover for rotatable movement relative thereto.

4. The apparatus of claim 1, wherein the device holder comprises a first and a second retaining finger mounted to the docking cover for movement relative to the docking cover, the first and second retaining fingers selectively movable by a vehicle occupant towards and away from one another to adjust a grip width between the first and second retaining fingers.

5. The apparatus of claim 1, wherein a dividing wall within the storage compartment separates the main and the second portions of the storage compartment.

6. A storage unit adapted for installation in a dashboard of a motor vehicle comprising:
    a storage compartment having a main portion;
    a main cover movable relative to the storage compartment between a closed position enclosing the main portion of the storage compartment and an open position permitting access to the main portion of the storage compartment; and
    a docking station within the storage compartment and comprising: a) a second portion of the storage compartment separated from the main portion of the storage compartment by a dividing wall, the second portion of the storage compartment being unobstructed by main cover when in the closed position; b) a docking cover movable relative to the storage compartment and separately form the main cover between a closed position enclosing the second portion of the storage compartment and wherein an upper surface of the docking cover is flush with an upper surface of the main cover, and an in-service position wherein an underside of the docking cover is exposed to an occupant of the vehicle; and c) a device holder attached to the underside of the docking cover for holding a mobile electronic device in an access position when the docking cover is in the in-service position.

7. The apparatus of claim 6, wherein the main portion and the second portion form a common edge along a portion of a perimeter of the storage compartment.

8. The apparatus of claim 6, wherein the device holder is mounted to the docking cover for rotatable movement relative to the docking cover.

9. The apparatus of claim 6, wherein the device holder comprises a first and a second retaining finger mounted to the docking cover for movement relative to the docking cover, the first and second retaining fingers selectively movable by a vehicle occupant towards and away from one another to adjust a grip width between the first and second retaining fingers.

10. A storage unit for installation in a dashboard of a motor vehicle comprising:
- a storage compartment having a forward end and a rear end and subdivided into a main portion and a second portion separate from the main portion and adjacent to the rear end of the storage compartment;
- a main cover attached to the storage compartment and movable between a) a closed position enclosing the main portion of the storage compartment and not enclosing the second portion of the storage compartment, and b) an open position allowing access to the main portion of the storage compartment;
- a docking cover attached to the storage compartment and movable separately from the main cover between a) a closed position wherein an underside of the docking cover is oriented toward an interior of the second portion of the storage compartment, and b) an in-service position wherein the underside of the docking cover is oriented toward the rear end of the storage compartment; and
- a device holder attached to the underside of the docking cover for holding a mobile electronic device in an access position when the docking cover is in the in-service position.

11. The apparatus of claim 10, wherein the device holder is mounted to the docking cover for rotatable movement relative to the docking cover.

12. The apparatus of claim 10, wherein the device holder comprises a first and a second retaining finger mounted to the docking cover for movement relative to the docking cover, the first and second retaining fingers selectively movable by a vehicle occupant towards and away from one another to adjust a grip width between the first and second retaining fingers.

* * * * *